(12) United States Patent
Subhraveti

(10) Patent No.: US 7,793,153 B2
(45) Date of Patent: Sep. 7, 2010

(54) CHECKPOINTING AND RESTORING USER SPACE DATA STRUCTURES USED BY AN APPLICATION

(75) Inventor: Dinesh Kumar Subhraveti, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 12/013,362

(22) Filed: Jan. 11, 2008

(65) Prior Publication Data

US 2009/0183027 A1 Jul. 16, 2009

(51) Int. Cl.
*G06F 11/00* (2006.01)
(52) U.S. Cl. .......................................... 714/35; 714/15
(58) Field of Classification Search .................. 714/35, 714/15; 717/130
See application file for complete search history.

(56) References Cited

U.S. PATENT DOCUMENTS

| | | | |
|---|---|---|---|
| 6,105,148 A | | 8/2000 | Chung et al. |
| 6,161,219 A | | 12/2000 | Ramkumar et al. |
| 6,708,288 B1 | * | 3/2004 | Ziegler et al. ................. 714/15 |
| 6,766,471 B2 | * | 7/2004 | Meth ............................ 714/16 |
| 7,117,354 B1 | * | 10/2006 | Browning et al. ........... 713/100 |
| 7,373,548 B2 | * | 5/2008 | Reinhardt et al. ............. 714/13 |
| 7,516,361 B2 | * | 4/2009 | Vick et al. .................... 714/15 |
| 2002/0194525 A1 | * | 12/2002 | Mathiske et al. ................ 714/5 |
| 2003/0088807 A1 | | 5/2003 | Mathiske et al. |
| 2003/0187911 A1 | * | 10/2003 | Abd-El-Malek et al. .... 709/108 |
| 2006/0085679 A1 | | 4/2006 | Neary et al. |
| 2006/0150010 A1 | | 7/2006 | Stiffler et al. |
| 2008/0046699 A1 | * | 2/2008 | Pauw et al. .................. 712/227 |
| 2008/0077934 A1 | * | 3/2008 | Browning et al. ........... 718/107 |
| 2008/0141255 A1 | * | 6/2008 | Browning et al. ........... 718/102 |
| 2009/0327807 A1 | * | 12/2009 | Varadarajan et al. .......... 714/15 |

OTHER PUBLICATIONS

Litzkow, et al., "Condor—A Hunter of Idle Workstations", IEEE, 8th International Conference on Distributed Computing Systems, San Jose, CA, 1988, pp. 104-111.

Litzkow, et al., "Supporting Checkpointing and Process Migration Outside the Unix Kernel", Usenix Winter Conference, San Francisco, CA 1992.

"Inside Microsoft Windows 2000, Third Edition", Microsoft, [online] [retrieved Nov. 30, 2007] http://www.microsoft.com/mspress/books/sampchap/4354a.aspx.

(Continued)

*Primary Examiner*—Bryce P Bonzo
(74) *Attorney, Agent, or Firm*—David W. Victor; Konrad Raynes and Victor LLP

(57) ABSTRACT

Provided are a method, system, and article of manufacture for checkpointing and restoring user space data structures used by an application accessing a data structure maintained by an operating system for an executing application. Information in the accessed data structure is saved with checkpoint information for the application. An operation to restore the application from the checkpoint information is initialized. A restored data structure is generated to include the saved information in the accessed data structure saved in the checkpoint information in response to restoring the application. An initialization routine of the application is modified to bypass initializing the data structure as part of the application initialization routine to restore the application.

20 Claims, 4 Drawing Sheets

OTHER PUBLICATIONS

Dieter, et al., "User-Level Checkpointing for Linux Threads Programs", Proceedings of the FREENIX Track, USENIX Annual Technical Conference, Boston, MA, Jun. 2001, pp. 81-92.

Osman, et al., "The Design and Implementation of Zap: A System for Migrating Computing Environments", Proceedings of the 5th Operating Systems Design and Implementation (OSDI 2002), Boston, MA, Dec. 2002.

"Microsoft Windows Internals, Fourth Edition: Microsoft Windows Server 2003, Windows XP, and Windows 2000", Microsoft, [online] [retrieved Nov. 25, 2007] http://book.itzero.com/read/microsoft/0507/Microsoft.Press.Microsoft . . . .

Mogul, et al., "Unveiling the Transport", ACM SIGCOMM Computer Communications Review, vol. 34, No. 1, Jan. 2004, pp. 99-106.

US Patent Application entitled "Gathering State Information for an Application and Kernel Components Called bvy the Application", Serial No. unknown, filed Jan. 11, 2008, by inventor D.K. Subhraveti.

US Patent Application entitled "Gathering Pages Allocated to an Application to Include in Checkpoint Information", Serial No. unknown, filed Jan. 11, 2008, by inventor D.K. Subhraveti.

\* cited by examiner

CHECKPOINTING AND RESTORING USER SPACE DATA STRUCTURES USED BY AN APPLICATION

BACKGROUND OF THE INVENTION

1. Field of the Invention

The present invention relates to a method, system, and article of manufacture for checkpointing and restoring user space data structures used by an application.

2. Description of the Related Art

An operating system may designate processes that are assigned to execute applications and components as running in a user space or kernel space. Typically, user applications are assigned to execute in the user address space and essential operations are assigned to execute in the kernel address space, such as resource allocation, low-level hardware interfaces, security, etc. A process may comprise one or more threads allocated to processor and computer resources to execute computer instructions. Multiple processes or multiple threads in one process may concurrently execute instructions for one application, or multiple processes may concurrently execute instructions for multiple applications. Multiple processes may execute on multiple processors. The term "process" as used herein refers to a process, thread or any other unit of execution allocated to execute instructions.

Certain applications may gather state information on the execution of an application to store in checkpoint information. The state of an application maintained in checkpoint information may be used for debugging and development and record and replay purposes. A record and replay program would allow the recreation of an application state to recreate the application so that it may run from the state as indicated in the checkpoint information.

There is a need in the art for improved techniques to gather state and system information related to application execution to allow improved recording of the checkpoint information for the application.

SUMMARY

Provided are a method, system, and article of manufacture for checkpointing and restoring user space data structures used by an application accessing a data structure maintained by an operating system for an executing application. Information in the accessed data structure is saved with checkpoint information for the application. An operation to restore the application from the checkpoint information is initialized. A restored data structure is generated to include the saved information in the accessed data structure saved in the checkpoint information in response to restoring the application. An initialization routine of the application is modified to bypass initializing the data structure as part of the application initialization routine to restore the application.

DETAILED DESCRIPTION

Figure 1:
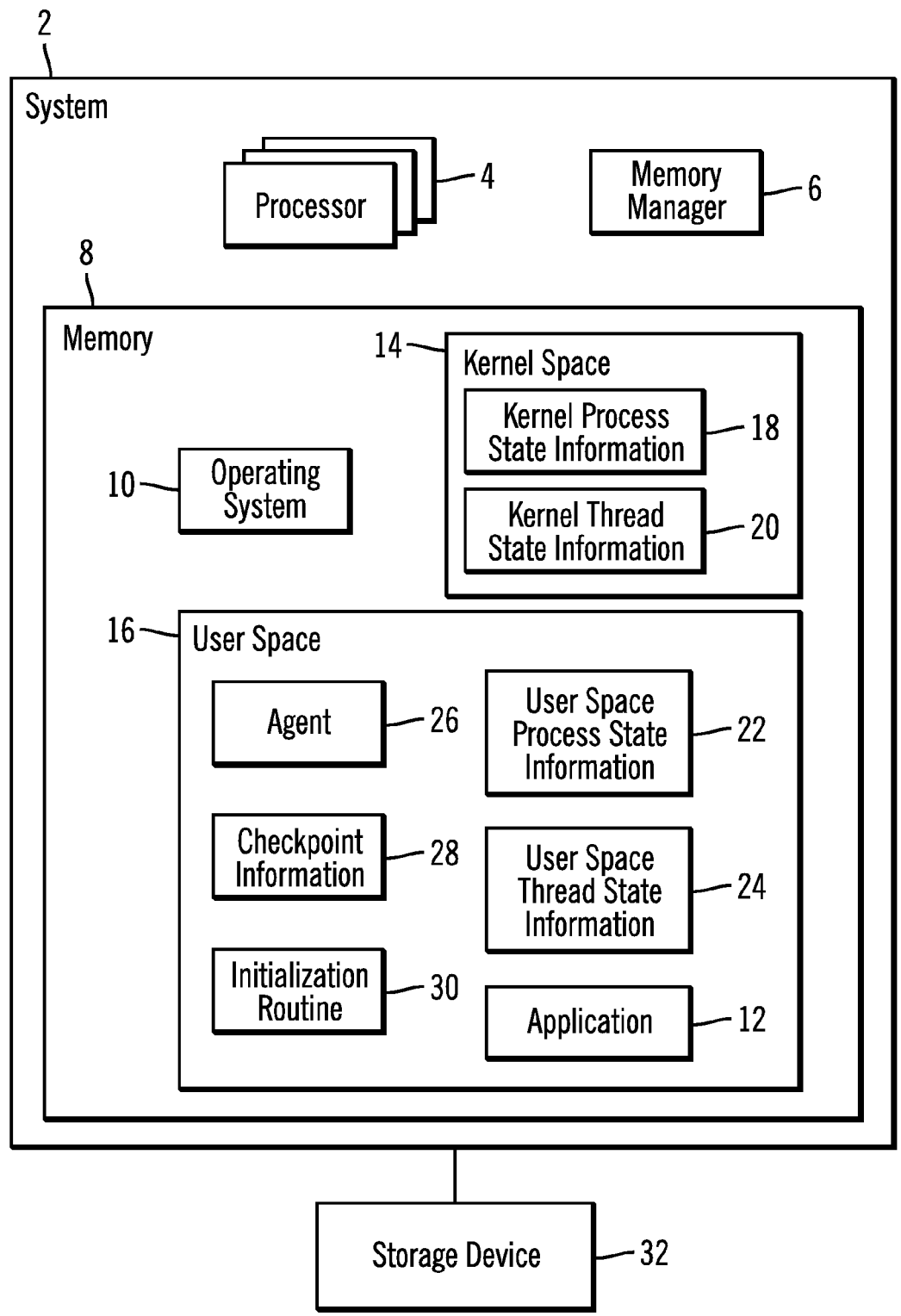
FIG. 1 illustrates an embodiment of a computing environment.

FIG. 1 illustrates an embodiment of a computing environment. A system 2 includes multiple processors 4 and a memory manager 6 managing access to a memory 8. The processor 4 loads into the memory 8 an operating system 10 providing a runtime environment for one or more applications 12. An operating system scheduler may spawn tasks that perform the application 12 operations. The tasks spawned to perform application operations may comprise processes, threads, other units of executions allocated by the operating system, etc. The memory manager 6 may map received virtual addresses used by the operating system 10 and processes to addresses memory pages.

The operating system 10 may allocate processes operating in the memory 6 into a kernel space 14 and a user space 16. Higher priority applications and operating system processes may execute in the kernel space 14.

The operating system 10 maintains system state information in the kernel space 14 on a process in kernel process state information 18 and information on one or more threads assigned to execute application 12 tasks in kernel thread state information 20. Certain process and thread state information for an application 12 may be maintained in the user space 16 as user space process state information 22 and user process thread state information 24 for one or more threads executing application 12 tasks. The user space process 22 and thread state 24 state information maintained in the user space 16 may comprise process and thread related information modified by user mode code, or application 12 code executing in the user space 16.

For instance, in a Microsoft® Windows® implementation, each Windows process is represented by an executive process (EPROCESS) block, which contains attributes relating to a process and contains and points to a number of other related data structures. The EPROCESS block and its related data structures exist in the kernel space 14, with the exception of a process environment block (PEB), which exists in the process address space because it contains information modified by user code. A Microsoft® Windows® thread is represented by an executive thread (ETHREAD) block having a block and structures that exist in the kernel address space, with the with the exception of a thread environment block (TEB), which exists in the user address space. The TEB stores context information for the image loader and various Windows® dynamic linked library (DLL) files. The TEB exists in the user address space because it is written to from user code executing in the user space 16.

An agent 26 is loaded and initialized when the application 12 is initialized and loaded. The agent 26 may gather information related to the application 12's execution and the user space process 22 and kernel space process 24 state information. The agent 26 may store the gathered information as checkpoint information 28 to provide state information related to the application 12 execution, including system information on the execution of the components called by the application 12. This checkpoint information 28 may be used to replicate the application 12 state on the same or different by restoring the application 12 to the state indicated in the checkpoint information 28. To restore an application, the agent 26 may invoke an initialization routine 30 to restore the objects and data structures of the application 12. The applications 12 and other data may be stored and loaded from a storage 32, such as a non-volatile storage device.

Figure 2:
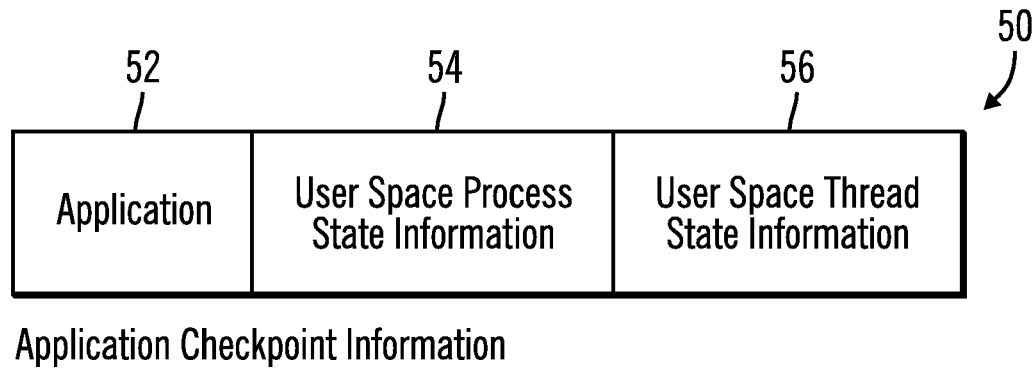
FIG. 2 illustrates an embodiment of application checkpoint information.

FIG. 2 illustrates an embodiment of application checkpoint information 50 maintained in the checkpoint information 28 for one application 12. The application checkpoint information 50 indicates the application 52 for which the information applies, user space process state information 54 saved from user process state information 22 for one or more processes assigned to execute the application 12 and user space thread state information 56 saved from user space thread state information 24 for one or more threads assigned to execute tasks for the application 12.

Figure 3:
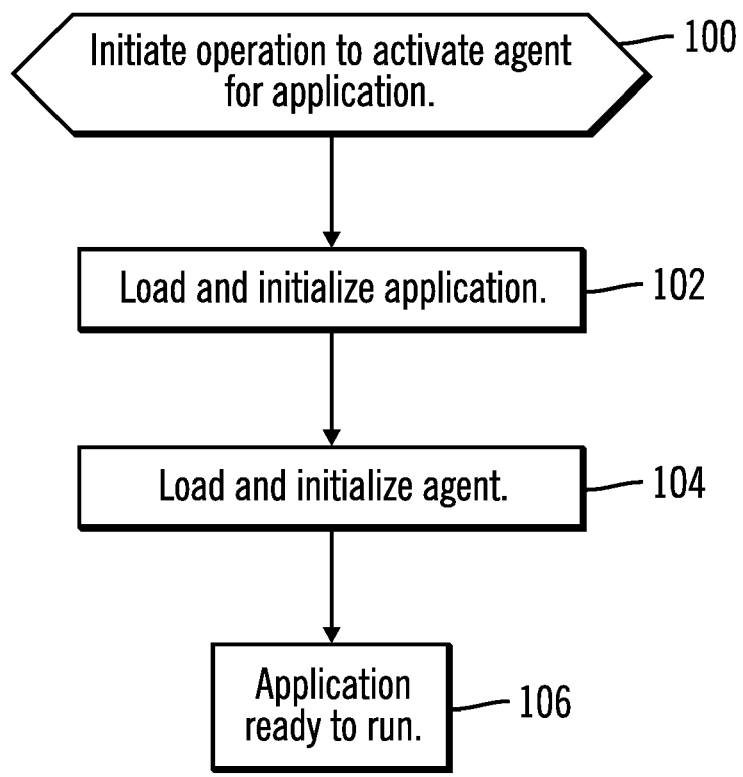
FIG. 3 illustrates an embodiment of operations to activate an agent that gathers state and system information for an application.

FIG. 3 illustrates an embodiment of operations performed to load the agent 26. Upon initiating (at block 100) the operation to activate the agent 26, the application 12 is loaded and initialized (at block 102). The agent 26 may then be loaded and initialized (at block 104). The application 12 may then run (at block 106). In one embodiment, the agent 26 may reside in the user address space of the application 12 and comprise dynamic linked library (DLL) files, such that the agent 26 is loaded when the application is loaded.

Figure 4:
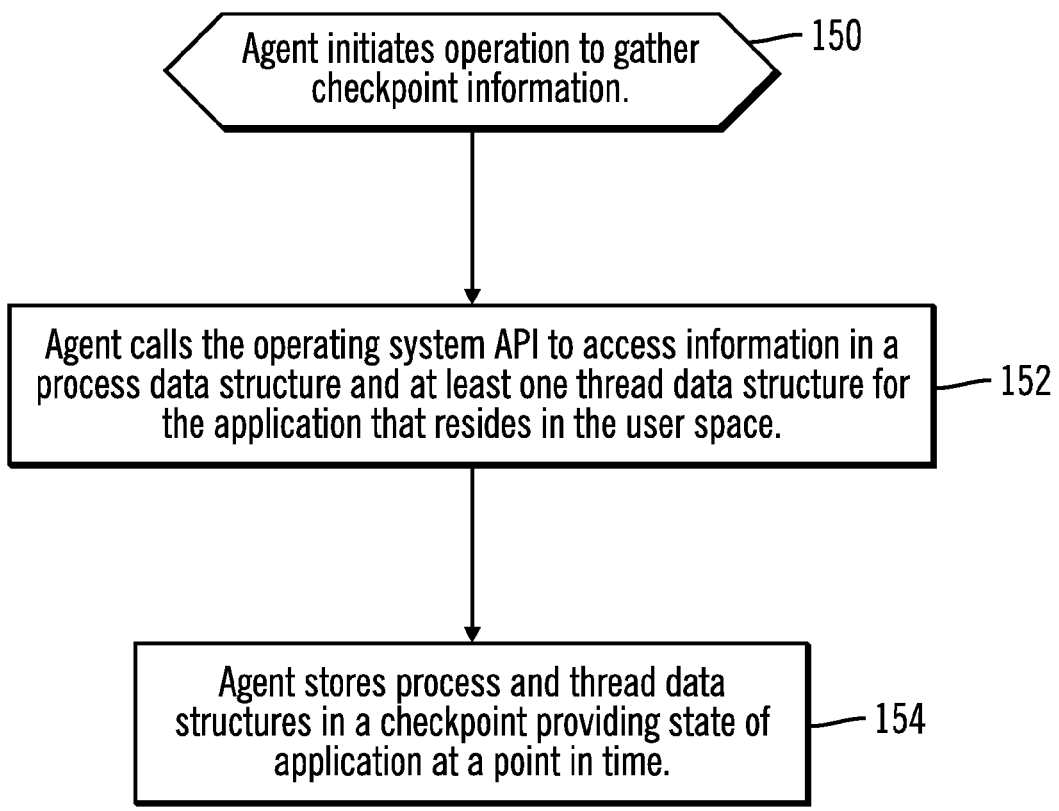
FIG. 4 illustrates an embodiment of operations to gather checkpoint information.

FIG. 4 illustrates an embodiment of operations performed by the agent 26 to gather state information for the application 12 to store in the checkpoint information 28. Upon initiating (at block 150) an operation to gather checkpoint information 28, the agent 26 gathers (at block 152) state and system information related to application execution, including information related to application operations, state of execution of application 12 calls, user space process 22 and user space thread 24 state information, and the state of any memory region used for the application 12 execution in the user space 16. The agent 26 stores (at block 154) the state and system information, including the user space process 22 and thread 24 state information, in the checkpoint information 54 and 56 providing the state of application at a point in time. The checkpoint information 50 may include other saved information.

Once the state and system information is stored with the checkpoint information 28, a checkpoint manager or other program may resume the operation of the application 12 from the state represented in the checkpoint information 12. The address space of the recreated application 12 may be populated with the memory state information stored in the checkpoint information 12, and the checkpointed user space process 54 and thread 56 state information (FIG. 2). To recreate an application 12, a new process for the application is created. The newly created process contains the executable image, ntdll.dll, PEB, TEB, and other system regions such as ANSI code page, shared memory data, mapped at the top of the process address space. The data segment portions of the executable image and ntdll.dll are overwritten from the respective contents saved in the checkpoint information 28. The rest of the address space of the process may be populated with the memory regions described by the checkpoint information 28. The application 12 default heap, thread stacks, regions containing the loader data and process environment variables, etc. are restored by mapping memory regions with appropriate size and attributes and overwriting them with the contents saved in the checkpoint information 28 without regard to their internal structure. In particular, the memory region containing the agent 26 is also mapped, so that the restarted instance of the process already has the agent 26 for subsequent checkpoints.

Figure 5:
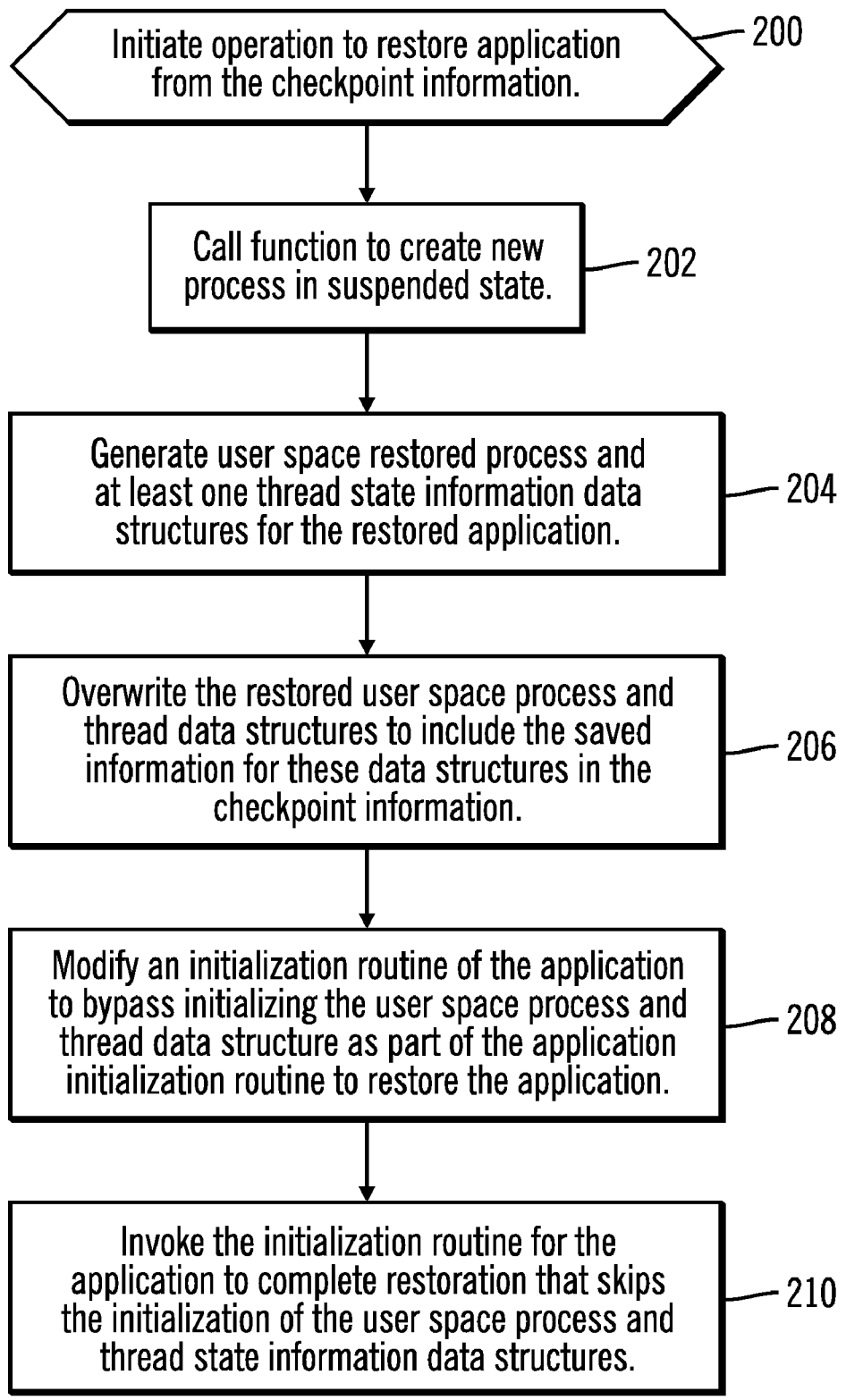
FIG. 5 illustrates an embodiment of operations to restore an application from the checkpoint information.

FIG. 5 illustrates an embodiment of operations performed by the agent 26 and operating system 10 application initialization APIs to restore the application 12 from checkpoint information 26. Upon initiating (at block 200) an operation to restore application 12 from the checkpoint information 28, the agent 22 calls a function to create (at block 202) a new process for the application 12. In a Microsoft® Windows® operating environment, a process may be created by calling the CreateProcess API in a suspended state. This create process operation may generate (at block 204) a restored user space process 22 and thread 24 state information data structures for the restored application 12, such as a PEB and one or more TEB objects. The agent 26 overwrites (at block 206) the restored user space process 22 and thread 24 state information to include the saved information 54 and 56 (FIG. 2) for these data structures in the checkpoint information. At this point, the agent 26 may further restore additional application 12 state information, such as obtaining the base addresses of the data segments of the system dlls, kernel32.dll and ntdll.dll in the new process using the VirtualQuery Win32 API.

The agent 26 may further modify (at block 208) an initialization routine 30 for the application 12 to bypass initializing the user space process 22 and thread state 24 information, and any other objects the agent 26 creates and overwrites with checkpoint information 28, as part of the application initialization routine 30 to restore the application 12. This modification prevents the initialization routine 30 from initializing and overwriting objects and information the agent 26 generated from the checkpoint information 28. For instance, in Microsoft® Windows® implementations, the initialization routine 30 may comprise an Asynchronous Procedure Call (APC). In such case, the agent 26 may modify the initialization routine by replacing the first five bytes of the initialization having the LdrInitializeThunk function, which is replaced with an unconditional jump instruction to another routine restore_initialize implemented in the agent.dll. When the modified initialization routine executes, it reaches the address of LdrInitializeThunk and jumps to restore_initialize function to bypass the operation to initialize the PEB and TEB objects. The initialization routine may then proceed to the next step of the initialization following the initialization of the PEB and TEB objects.

The agent 26 invokes (at block 210) the initialization routine 30 for the application to complete the restoration of the application 12 that skips the initialization of the user space process 22 and thread state 24 information. During execution, the initialization routine 30 may create the kernel process 18 and thread 20 state information objects. After initialization, the agent 26 may invoke an API to start running the restored application 12.

Described embodiments discussed certain implementations in the Microsoft® Windows® operating system environment. However, the embodiments described herein may be used with suitable operating systems other than Microsoft® Windows® to allow checkpointing and restoration of state information in user space data structures. In the described embodiments, user space state information that was checkpointed and restored included process and thread state information maintained in the user space. In further embodiments, state information in addition to process and thread information, may be checkpointed and restored according to the described embodiments.

Described embodiments provide techniques to save certain user space data structures maintained for an executing application, such as process and thread state information, in checkpoint information. The application may be restored from the checkpoint information, including information on the checkpointed process and thread state information.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   accessing a data structure maintained by an operating system for an executing application;
   saving information in the accessed data structure with checkpoint information for the application;
   initiating an operation to restore the application from the checkpoint information;
   generating a restored data structure to include the saved information in the accessed data structure saved in the checkpoint information in response to restoring the application; and
   modifying an initialization routine of the application to bypass initializing the data structure as part of the application initialization routine to restore the application.

2. The method of claim 1, wherein the operating system maintains the data structure in a user space allocated to the application and wherein the information in the data structure includes system state information related to execution of the application.

3. The method of claim 1, wherein a plurality of data structures are accessed and the information of the plurality of data structures are saved in the checkpoint information, and wherein generating the restored data structure comprises generating a plurality of restored data structures from the checkpoint information.

4. The method of claim 3, wherein the data structures include a process data structure including information on a process allocated to execute the application and at least one thread data structure including information on at least one thread allocated to execute the application.

5. The method of claim 4, wherein the process and the at least one thread data structures are used by the operating system to execute the process and the at least one thread allocated to execute the application, and the process and the at least one thread data structures are maintained in a user space allocated to the application.

6. The method of claim 1, further comprising:
creating a new instance of the data structure comprising the restored data structure in response to initiating the operation to restore the application, wherein generating the restored data structure from the checkpoint information comprises overwriting the generated restored data structure with the data structure information in the checkpoint information.

7. The method of claim 6, wherein modifying an initialization routine of the application to bypass initializing the data structure comprises:
replacing an instruction in the initialization routine that initializes the generated restored data structure with a jump instruction to move to a next initialization routine operation and not initialize the restored data structure.

8. A system, comprising:
a processor;
a computer readable medium including an operating system and an agent, wherein the agent is executed to perform operations, the operations comprising:
accessing a data structure maintained by the operating system for an executing application;
saving information in the accessed data structure with checkpoint information for the application;
initiating an operation to restore the application from the checkpoint information;
generating a restored data structure to include the saved information in the accessed data structure saved in the checkpoint information in response to restoring the application; and
modifying an initialization routine of the application to bypass initializing the data structure as part of the application initialization routine to restore the application.

9. The system of claim 8, wherein the operating system maintains the data structure in a user space allocated to the application and wherein the information in the data structure includes system state information related to execution of the application.

10. The system of claim 8, wherein a plurality of data structures are accessed and the information of the plurality of data structures are saved in the checkpoint information, and wherein generating the restored data structure comprises generating a plurality of restored data structures from the checkpoint information.

11. The system of claim 10, wherein the data structures include a process data structure including information on a process allocated to execute the application and at least one thread data structure including information on at least one thread allocated to execute the application.

12. The system of claim 8, wherein the operations further comprise:
creating a new instance of the data structure comprising the restored data structure in response to initiating the operation to restore the application, wherein generating the restored data structure from the checkpoint information comprises overwriting the generated restored data structure with the data structure information in the checkpoint information.

13. The system of claim 12, wherein modifying an initialization routine of the application to bypass initializing the data structure comprises:
replacing an instruction in the initialization routine that initializes the generated restored data structure with a jump instruction to move to a next initialization routine operation and not initialize the restored data structure.

14. An article of manufacture comprising a computer readable storage medium having code interacting with an operating system and to perform operations, the operations comprising:
accessing a data structure maintained by the operating system for an executing application;
saving information in the accessed data structure with checkpoint information for the application;
initiating an operation to restore the application from the checkpoint information;
generating a restored data structure to include the saved information in the accessed data structure saved in the checkpoint information in response to restoring the application; and
modifying an initialization routine of the application to bypass initializing the data structure as part of the application initialization routine to restore the application.

15. The article of manufacture of claim 14, wherein the operating system maintains the data structure in a user space allocated to the application and wherein the information in the data structure includes system state information related to execution of the application.

16. The article of manufacture of claim 14, wherein a plurality of data structures are accessed and the information of the plurality of data structures are saved in the checkpoint information, and wherein generating the restored data structure comprises generating a plurality of restored data structures from the checkpoint information.

17. The article of manufacture of claim 16, wherein the data structures include a process data structure including information on a process allocated to execute the application and at least one thread data structure including information on at least one thread allocated to execute the application.

18. The article of manufacture of claim 17, wherein the process and the at least one thread data structures are used by the operating system to execute the process and the at least one thread allocated to execute the application, and the process and the at least one thread data structures are maintained in a user space allocated to the application.

19. The article of manufacture of claim 14, wherein the operations further comprise:
creating a new instance of the data structure comprising the restored data structure in response to initiating the operation to restore the application, wherein generating the restored data structure from the checkpoint information comprises overwriting the generated restored data structure with the data structure information in the checkpoint information.

20. The article of manufacture of claim 19, wherein modifying an initialization routine of the application to bypass initializing the data structure comprises:
replacing an instruction in the initialization routine that initializes the generated restored data structure with a jump instruction to move to a next initialization routine operation and not initialize the restored data structure.

* * * * *